J. W. GATES.
SPRING FORK FOR WHEELED VEHICLES.
APPLICATION FILED AUG. 11, 1908.

940,245. Patented Nov. 16, 1909.

Witnesses:—

Inventor;
John W. Gates
by Townsend Lyon & Hackley
his Attys.

UNITED STATES PATENT OFFICE.

JOHN W. GATES, OF LOS ANGELES, CALIFORNIA.

SPRING-FORK FOR WHEELED VEHICLES.

940,245.  Specification of Letters Patent.  Patented Nov. 16, 1909.

Application filed August 11, 1908. Serial No. 448,031.

*To all whom it may concern:*

Be it known that I, JOHN W. GATES, a citizen of the United States, residing at Los Angeles, county of Los Angeles, State of California, have invented a new and useful Spring-Fork for Wheeled Vehicles, of which the following is a specification.

This invention relates to spring forks for motor cycles, bicycles and the like wheeled vehicles, and the main object of the invention is to provide a spring fork which will yield to obstructions in the roadway with a minimum of lift or jar of the frame of the machine.

When the front wheel of the motor cycle or bicycle encounters an obstruction in the roadway, there is a tendency to raise the front wheel and a tendency to retard the forward motion thereof. According to the present invention these two tendencies are accommodated in the fork construction in such manner that the motion of the wheel takes place with the utmost freedom, and consequently with the least tendency to raise the forward end of the frame. This effect is accomplished by supporting the wheel, so that in yielding to the obstruction the wheel axis tilts upwardly and rearwardly, thus passing freely over the obstruction with no substantial rise of the frame.

The accompanying drawings illustrate the invention.

Figure 1:
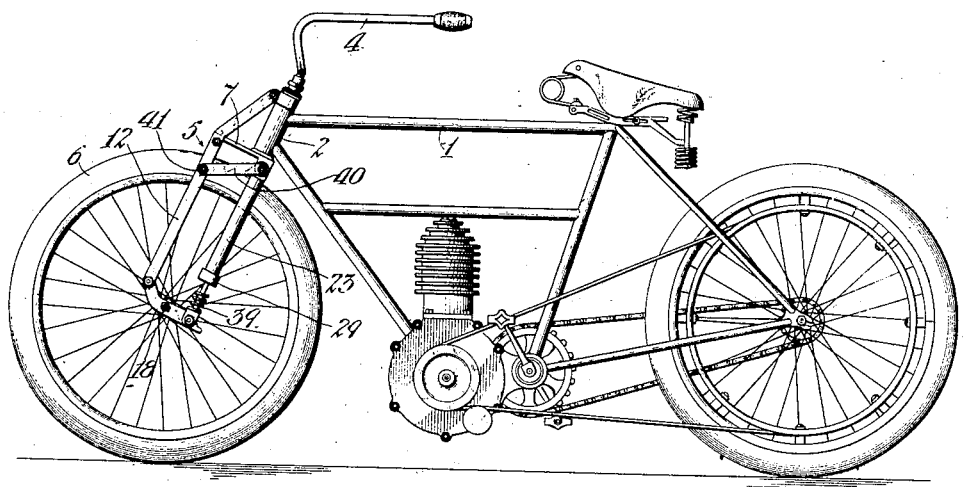
Figure 2:
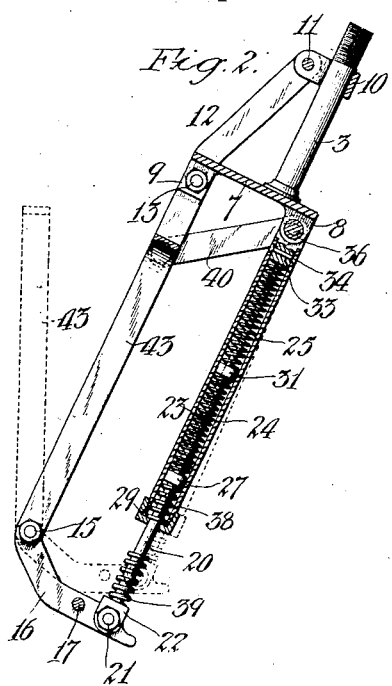
Figures 3, 4:
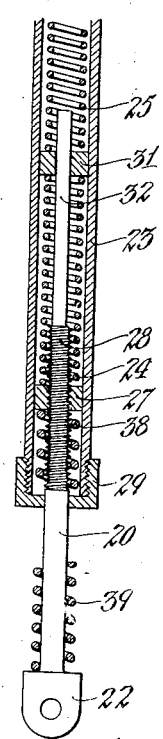

Figure 1 is a side elevation of a motor cycle provided with the invention. Fig. 2 is a vertical section of the spring fork. Fig. 3 is a front elevation of the front wheel with a spring thereon. Fig. 4 is a vertical section of the spring devices.

In Fig. 1, 1 designates the frame of a motor cycle, bicycle, etc. At the forward upper end of this frame is provided a sleeve 2 serving as a bearing for the steering post 3 to which handle bars 4, and the fork 5 of the front wheel 6 are attached. The steering post 3 at its lower end has an extension 7 formed as a plate, with the down-turned lugs or flanges 8 at each rear corner, and down-turned lugs or flanges 9 at each front corner. A split clamp ring 10 surrounds the upper end of said steering post above the bearing sleeve 2, and is clamped by bolt 11 so as to be tight on the steering post. Said bolt 11 also serves to secure to said sleeve 2, bars 12 which extend down on either side of the plate 7 to form the fork, and are secured by bolts 13 to the lugs 9 of said plate, said bars 12 being extended downwardly to carry, at their lower ends, the bolts or fulcrums 15 for the levers 16 that support the front wheel. The arbor or axle 17 of the front wheel is supported at its ends by the said levers 16, and fastened by nuts 18. In order that the two sides of the device shall move in unison without skewing or twisting of the wheel in striking an obstruction more or less to one side, or to equalize the action on the two sides of the wheel it is preferred to connect the levers 16 as by means of the yoke 43 which is formed integrally with said levers, and extends in U-shape upwardly over the front wheel 6 so that said levers 16 move together irrespective of the manner in which the blow is applied to the wheel. The levers 16 extend downwardly and rearwardly from their fulcrums 15 so that the connection to the wheel axle 17 is below and at the rear of said fulcrums, and at a point still more to the rear the said fulcrums are connected to the upper part of the fork or the steering post member by elastic resisting means. Such an elastic means is provided for each lever 16 of the machine. Said means consist of a rod 20 pivotally connected to lever 16 by bolt 21 passing through perforated ears 22 at the lower end of said rod, and through the lever 16, a case or tube 23 within which said rod 20 extends, said tube being pivoted to lugs 8 of plate 7, and springs 24, 25 within said tube and controlling the motion of said rod. A circular nut or screw collar 27 screws on the screw threaded portion 28 of rod 20 serving both as a guide for said rod by fitting within the tube 23, and as an abutment for the spring. Said rod 20 is further guided in a screw cap 29 which screws on the lower end of the tube 23, and in order to still further guide the rod and prevent lateral strain and resultant binding. A plain collar 31 is provided sliding within tubes 23 and on the reduced upper end 32 of rod 20. This plain collar guides the rod 20, and is inserted between the lower spring 24 and the upper spring 25, so that as regards compression said springs act as one. The upper end of upper spring bears against the closed end of tube 23, a plug 33 being inserted in the upper end of the said tube, and fastened as by means of rivet 34 and perforated to receive the bolt or fulcrum 36 which passes through the lugs 8 on the plate 7, aforesaid.

A rebound spring 38 is provided within the tube 23 and between the nut 27 on rod 20 and the lower end piece of cap 29.

Near the lower end of rod 20 is provided a buffer spring 39, this buffer spring being of such length that normally its upper end is not in contact with the lower end or cap of tube 23, and it only comes in contact when there is an exceptionally violent motion. The several springs 25, 24, 38, and 39 are helical springs adapted to surround the rod 20.

In order to brace the steering post fork, bars 40 may extend forwardly from the pivot bolt 36 aforesaid, being connected by bolts 41 at their forward ends to the bars 12 below the bolts 13. This lower portion of the bars 12 may extend more or less in parallelism with the steering post 3, and above the plate 7, said bars 12 may be bent rearwardly so as to join to the clamp ring 10 close to the steering post.

The operation is as follows: Under the weight of the machine and the rider the springs 24, 25 are compressed somewhat, the pressure exerted at the front wheel axis being transmitted partly to the bars 12 of the fork through levers 16, and partly to the set of springs 24, 25 at each side of the machine. At the moment when the machine is set in motion there is a rearward reaction on the front wheel representing the tractive resistance thereof, and this tends to cause the front wheel to move to some extent upwardly and rearwardly on the fulcrums 15, thereby increasing the pressure on the springs 24, 25, and correspondingly increasing the portion of the weight which is taken by said springs, so that the front end of the machine is then substantially spring supported, and easy riding is the result. When an obstruction is encountered this same effect occurs in more marked form; the levers 16 and yoke 43 turning on fulcrums 15 as shown in dotted lines in Fig. 2, and the wheel riding upwardly and rearwardly on said fulcrums 15 as shown in dotted lines in Fig. 2 so that it yields freely to the obstruction with substantially no lift or jar, the upward movement necessary to climb over the obstruction being accompanied by the rearward movement, which itself is the normal result of retardation of the wheel by the obstruction. This motion is elastically resisted by the compression of the springs 24, 25. If the motion is sufficiently violent, the buffer spring 39 will bring up against the lower end of the spring cap or tube 23, arresting the motion with a buffer effect. When the obstruction is passed, the springs 24, 25 regain their normal position, and the springs 38, take the reaction or rebound. By adjusting nut 27 the reacting action of springs 24, 25 may be adjusted to give any desired ease of movement. The yoke member 43 connects the wheel supporting levers 16 on both sides of the wheel in such manner that the action of the spring means is equalized on the two sides of the wheel so that there is no twisting or skewing of the wheel due to side strain. It will be understood that the term bicycle, as used herein includes motor cycles.

What I claim is:

1. The combination with a wheel of a wheeled vehicle, of a frame having means extending on both sides of the wheel, said means comprising at each side of the wheel a forward, rigid member, and a rearward, elastic member, lever means pivoted to said members at each side of the wheel and directly connected to the axle of the wheel at each side of the wheel to provide for vertical and rearward movements of the wheel and to equalize the movement on the two sides of the wheel.

2. The combination with a wheel of a wheeled vehicle, of a frame having means extending on both sides of the wheel, said means comprising at each side of the wheel a forward, rigid member, and a rearward, elastic member, lever means pivoted to said members at each side of the wheel and directly connected to the axle of the wheel at each side of the wheel, said lever means having a yoke member extending over the wheel, to provide for vertical and rearward movements of the wheel and to equalize the movement on the two sides of the wheel.

3. The combination with the frame of a wheeled vehicle, having a steering post member comprising a steering post sleeve, of a steering post mounted to turn in said sleeve, a fork connected to said steering post member, a lever pivoted to each arm of said fork and extending rearwardly and downwardly, means uniting said levers and extending upwardly over the front wheel, a front wheel connected to and supported by said levers, and elastic resisting means connecting each of said levers to the steering post member.

4. The combination with the frame of a wheeled vehicle, having a steering post member comprising a steering post sleeve, of a steering post mounted to turn in said sleeve, a fork connected to said steering post member, a lever pivoted to each arm of said fork and extending rearwardly and downwardly, means uniting said levers and extending upwardly over the front wheel, a front wheel connected to and supported by said levers, and elastic resisting means connecting each of said levers to the steering post member, and comprising a tube pivotally connected to the steering post member, spring means in said tube, and a rod connected to the lever and extending in said tube, said rod having a nut screwing thereon and engaging said spring means.

5. The combination with the frame of a wheeled vehicle, having a steering post member comprising a steering post sleeve, of a steering post mounted to turn in said sleeve, a fork connected to said steering post member, a lever pivoted to each arm of said fork and extending rearwardly and downwardly, means uniting said levers and extending upwardly over the front wheel, a front wheel connected to and supported by said levers, and elastic resisting means connecting each of said levers to the steering post member, and comprising a tube pivotally connected to the steering post member; spring means in said tube, and a rod connected to the lever and extending in said tube, said rod having a nut screwing thereon and engaging said spring means, an additional spring above the first named spring and a collar slidable on the rod and within the tube between the two springs.

6. The combination with the frame of a wheeled vehicle, having a steering post member comprising a steering post sleeve, of a steering post mounted to turn in said sleeve, a fork connected to said steering post member, a lever pivoted to each arm of said fork and extending rearwardly and downwardly, means uniting said levers and extending upwardly over the front wheel, a front wheel connected to and supported by said levers, and elastic resisting means connecting each of said levers to the steering post member, and comprising a tube pivotally connected to the steering post member, spring means in said tube, and a rod connected to the lever and extending in said tube, said rod having a nut screwing thereon and engaging said spring means, a rebound spring in the lower part of the tube and engaging the said nut, and a screw cap at the lower end of the tube, engaging said rebound spring.

7. The combination with the frame of a wheeled vehicle, having a steering post member comprising a steering post sleeve, of a steering post mounted to turn in said sleeve, a fork connected to said steering post member, a lever pivoted to each arm of said fork and extending rearwardly and downwardly, means uniting said levers and extending upwardly over the front wheel, a front wheel connected to and supported by said levers, and elastic resisting means connecting each of said levers to the steering post member, and comprising a tube pivotally connected to the steering post member, spring means in said tube, and a rod connected to the lever and extending in said tube, said rod having a nut screwing thereon and engaging said spring means, and a buffer spring at the lower joints of each rod to engage the lower end of the said tube.

8. The combination with a wheel of a wheeled vehicle, of a frame comprising a wheel supporting means extending on each side of said wheel, a lever pivoted to said supporting means at each side of the wheel, means uniting said levers and extending over the wheel, said wheel being connected to and supported by said levers, elastic resisting means connecting each of said levers to the said supporting means and comprising a tube pivotally connected to the said supporting means, spring means in said tube, and a rod connected to the lever and extending in said tube, said rod having a nut screwing therein and engaging said spring means.

9. The combination with a wheel of a wheeled vehicle, of a frame comprising a wheel supporting means extending on each side of said wheel, a lever pivoted to said supporting means at each side of the wheel, means uniting said levers and extending over the wheel, said wheel being connected to and supported by said levers, elastic resisting means connecting each of said levers to the said supporting means and comprising a tube pivotally connected to the said supporting means, spring means in said tube, a rod connected to the lever and extending in said tube, said rod having a nut screwing therein and engaging said spring means, an additional spring above the first-named spring, and a collar slidable on the rod and within the tube between the two springs.

10. The combination with a wheel of a wheeled vehicle, of a frame comprising a wheel supporting means extending on each side of said wheel, a lever pivoted to said supporting means at each side of the wheel, means uniting said levers and extending over the wheel, said wheel being connected to and supported by said levers, elastic resisting means connecting each of said levers to the said supporting means and comprising a tube pivotally connected to the said supporting means, spring means in said tube, a rod connected to the lever and extending in said tube, said rod having a nut screwing therein and engaging said spring means, a rebound spring in the lower part of the tube and engaging the said nut, and a screw cap at the lower end of the tube engaging said rebound spring.

In testimony whereof, I have hereunto set my hand at Los Angeles California this 4th day of August 1908.

JOHN W. GATES.

In presence of
ARTHUR P. KNIGHT,
FRANK L. A. GRAHAM.